(12) United States Patent  (10) Patent No.: US 9,284,034 B2
Otto  (45) Date of Patent: Mar. 15, 2016

(54) AIRCRAFT WING FLAP DEVICE AND METHOD OF OPERATING THE SAME

(71) Applicant: William M. Otto, Yorba Linda, CA (US)

(72) Inventor: William M. Otto, Yorba Linda, CA (US)

(73) Assignee: OTTO AVIATION GROUP, Yorba Linda, CA (US)

( * ) Notice: Subject to any disclaimer, the term of this patent is extended or adjusted under 35 U.S.C. 154(b) by 104 days.

(21) Appl. No.: 14/154,661

(22) Filed: Jan. 14, 2014

(65) Prior Publication Data

US 2014/0197272 A1  Jul. 17, 2014

Related U.S. Application Data

(60) Provisional application No. 61/753,215, filed on Jan. 16, 2013.

(51) Int. Cl.
*B64C 3/38* (2006.01)
*B64C 5/10* (2006.01)
*B64C 9/00* (2006.01)
(Continued)

(52) U.S. Cl.
CPC . *B64C 1/00* (2013.01); *B64C 1/065* (2013.01); *B64C 1/069* (2013.01); *B64C 1/10* (2013.01); *B64C 3/185* (2013.01); *B64C 3/26* (2013.01); *B64C 3/58* (2013.01); *B64C 5/02* (2013.01); *B64C 5/16* (2013.01); *B64C 9/02* (2013.01); *B64C 9/16* (2013.01); *B64C 9/20* (2013.01); *B64C 13/30* (2013.01); *B64C 25/02* (2013.01); *B64C 25/10* (2013.01); *B64C 25/12* (2013.01); *B64C 25/14* (2013.01); *B64C 25/18* (2013.01); *B64C 25/20* (2013.01); *B64C 25/22* (2013.01); *B64D 33/10* (2013.01); *B64D 37/04* (2013.01); *B64C 2025/125* (2013.01); *F02B 37/001* (2013.01); *Y02T 50/32* (2013.01); *Y02T 50/44* (2013.01)

(58) Field of Classification Search
CPC .............. B64C 9/04; B64C 9/02; B64C 9/16; B64C 9/20; B64C 9/10; B64C 9/06
See application file for complete search history.

(56) References Cited

U.S. PATENT DOCUMENTS 2,257,215 A  9/1941  Zap
2,405,726 A  8/1946  Zap
(Continued)

FOREIGN PATENT DOCUMENTS

GB  558045  *  7/1942
GB  558045 A1  12/1943

OTHER PUBLICATIONS

International Search Report and Written Opinion in PCT/US2014/11641 issued on Oct. 7, 2014, 11 pages.

*Primary Examiner* — Philip J Bonzell
(74) *Attorney, Agent, or Firm* — Vedder Price, P.C.

(57) ABSTRACT

A wing flap control system on a wing comprising at least two control plates having an opening sized to accommodate a drive shaft, a drive shaft that engages each of the openings in each of the plurality of plates, a sprocket rotatively affixed the drive shaft with the drive shaft penetrating the other control plate, at least two idler sprockets between the control plates, a chain wrapped around the sprocket and idler sprockets, a support arm rotatively coupled to the chain by a chain shoe and to a foreflap, a link arm rotatively coupled to the support arm and to a flap, where movement of the drive shaft causes the foreflap and flap to extend and retract to increase or decrease the surface area of the wing.

10 Claims, 14 Drawing Sheets

(51) Int. Cl.

| | |
|---|---|
| *B64C 13/00* | (2006.01) |
| *B64C 1/00* | (2006.01) |
| *B64C 1/10* | (2006.01) |
| *B64C 25/02* | (2006.01) |
| *B64C 25/10* | (2006.01) |
| *B64C 25/18* | (2006.01) |
| *B64C 25/22* | (2006.01) |
| *B64C 25/14* | (2006.01) |
| *B64C 1/06* | (2006.01) |
| *B64C 3/18* | (2006.01) |
| *B64C 3/26* | (2006.01) |
| *B64C 3/58* | (2006.01) |
| *B64C 5/02* | (2006.01) |
| *B64C 5/16* | (2006.01) |
| *B64C 9/02* | (2006.01) |
| *B64C 9/16* | (2006.01) |
| *B64C 9/20* | (2006.01) |
| *B64C 13/30* | (2006.01) |
| *B64C 25/12* | (2006.01) |
| *B64C 25/20* | (2006.01) |
| *B64D 33/10* | (2006.01) |
| *B64D 37/04* | (2006.01) |
| *F02B 37/00* | (2006.01) |

(56) References Cited

U.S. PATENT DOCUMENTS

| | | | |
|---|---|---|---|
| 2,779,555 A | * | 1/1957 | Danielson ............... 244/216 |
| 2,992,796 A | | 7/1961 | Wheldon |
| 3,528,632 A | | 9/1970 | Miles et al. |
| 4,172,575 A | | 10/1979 | Cole |
| 5,788,190 A | | 8/1998 | Siers |
| 5,879,209 A | | 3/1999 | Jones |
| 6,098,927 A | | 8/2000 | Gevers |

\* cited by examiner

AIRCRAFT WING FLAP DEVICE AND METHOD OF OPERATING THE SAME

CROSS REFERENCE TO RELATED APPLICATIONS

This application claims priority to U.S. Provisional Patent Application Ser. No. 61/753,215, filed Jan. 16, 2013, which is incorporated by reference herein in its entirety.

BACKGROUND OF THE INVENTION

The present invention was borne out of frustration with the cost and inefficiency of the airlines' hub-and-spoke transportation model. This model was conceived by the airline industry, initially in an attempt to restrain passengers from using interline transfers to arrive at their destinations. It requires dense concentrations of passengers both at the relatively few hub facilities and in ever larger aircraft flying to fewer and fewer destinations. The inefficiencies for the traveler arise out of the time wasted traveling long distances from their true origin to the large hub or major airport, enduring the lengthy lines at check-in and security check points, and the ever-longer boarding process on the ever larger aircraft. In addition, the traveler must often fly to cities that are well out of the way to his final destination, and transfer with additional wasted connection times. The result is that for short trips (approximately 500 miles) average speeds reduce to the vicinity of 100 mph, and many longer trips that involve just one connection drop to 200 to 300 mph average. This inefficiency raises costs for the consumer, especially where the inefficiencies require overnight stays in order to catch connecting flights. There is an additional factor which is a disadvantage of the current hub and spoke system. The current system creates large concentrations of people, both at terminals and in ever larger aircraft, that create prime targets for terrorist activity. Larger numbers of much smaller aircraft operating in a widely distributed transportation system would present a more difficult target for any significant military or terrorist activity.

Clearly, there are compelling reasons for wanting an air transportation system that is economically superior to our current air transportation system in acquisition, operation and maintenance costs. To be a viable competitor, the system should have true origin to true destination speeds that significantly exceed current system speeds. It should require no additional infrastructure, and it should package passengers in small enough units that both the passenger load and the aircraft are militarily insignificant targets. To be truly competitive, it should provide non-stop transcontinental and intercontinental travel from any local airport to any other local airport. And ticket prices should be highly competitive with current average ticket prices.

Such a transportation system requires a unique aircraft. It must be capable of operation from any current airfield. Preferably, it would have operating costs well below current costs and competitive with commercial airliners, cruise at higher system speed than current commercial aircraft, have a longer range with full passenger and luggage load than most current business aircraft, provide passenger comfort comparable to commercial aircraft, and be capable of all-weather operation. The plane should also provide for ease of maintenance and require only a single pilot.

SUMMARY OF THE INVENTION

One embodiment consistent with the present invention includes a wing flap control system on a wing comprising at least two control plates having an opening sized to accommodate a drive shaft, a drive shaft that engages each of the openings in each of the plurality of plates, a sprocket rotatively affixed the drive shaft with the drive shaft penetrating the other control plate, at least two idler sprockets between the control plates, a chain wrapped around the sprocket and idler sprockets, a support arm rotatively coupled to the chain by a chain shoe and to a foreflap, a link arm rotatively coupled to the support arm and to a flap where movement of the drive shaft causes the foreflap and flap to extend and retract to increase or decrease the surface area of the wing.

In another embodiment, the chain shoe slides in a first slot formed on the surface of the control plate.

In another embodiment, the link arm slides in a second slot formed on the surface of the control plate.

In another embodiment, the first slot is substantially straight horizontal.

In another embodiment, the second slot is substantially arc shaped.

In another embodiment, the link arm is connected to the flap and foreflap by a tilt arm.

In another embodiment, the link arm is substantially 'U' shaped.

In another embodiment, a cover plate is included on a first side the control plate.

In another embodiment, at least two cover plates are included on the second side of at least one cover plate.

In another embodiment, the link arm is rotatively connected to connected to the support arm by a shoe.

DESCRIPTION OF THE DRAWINGS

Details of the present invention, including non-limiting benefits and advantages, will become more readily apparent to those of ordinary skill in the relevant art after reviewing the following detailed description and accompanying drawings, wherein.

DETAILED DESCRIPTION OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings. The term "top portion" is used herein to mean the portion of the fuselage farthest from the ground when the airplane is not in flight and the term "bottom portion" is herein to mean the portion of the fuselage closest to the ground when the airplane is not in flight.

The design of the present invention makes use of aerodynamic shapes that are extensively laminar within their Reynolds number operating regime. Intersections of wing, empennage and fuselage are minimized, elliptical lift profiles are used on all lifting surfaces, and wing and horizontal tail shapes are approximately elliptical. The fuselage shape is derived from a modified zero camber extensively laminar airfoil section revolved about the longitudinal axis, thus making full use of pressure recovery to minimize form drag. The external aerodynamic shapes are mostly provided by gloves that fit over the frame of the aircraft, but are isolated from the frame so as to reduce surface waviness under load to an absolute minimum. This also permits easy one piece complete removal of the external skins for inspection of the frame and frame elements and maintenance of the operating systems attached to the frame.

The wing structure of the aircraft consists of a box-and-channel structure that extends across approximately 90% of the span of the wing structure and is open to the rear but stabilized in compression. The wing structure is a composite beam with ply orientation and shape tailored to provide structural coupling in bending and torsion to generate variable wing washout as a function of bending to limit vertical wing loading and to provide damping of the major flutter modes. Each tail surfaces have similar spar-and-glove design to allow for ease of inspection of all primary structure, decoupling of structural deformation from skin surfaces, and ease of exchange of external skin with new shapes for rapid repair of damaged surfaces as well as exchange of airfoil shapes with updated shapes or different internal systems should they become available.

Figure 1A:
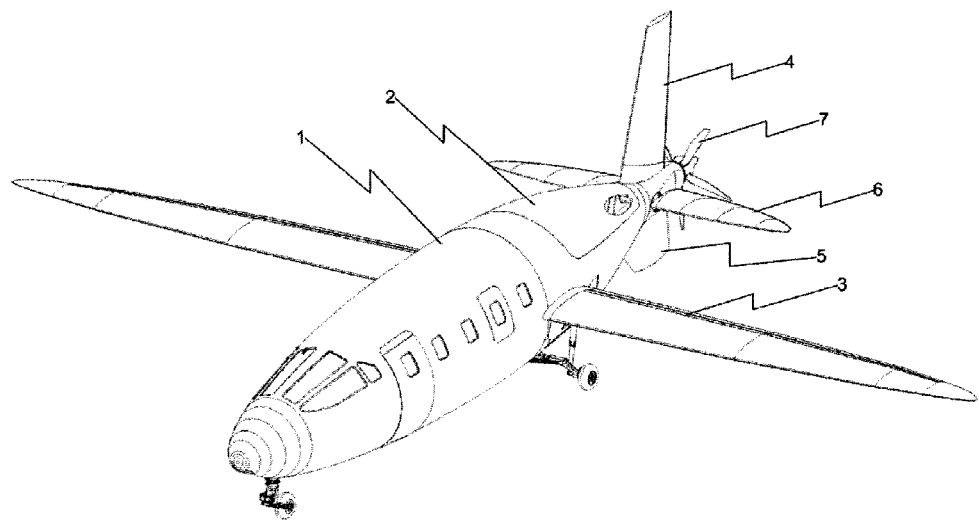
FIG. 1A depicts one embodiment of an aircraft consistent with the present invention.

FIG. 1A depicts one embodiment of an aircraft consistent with the present invention. The aircraft includes a forward fuselage 1, a rear fuselage 2, a midwing 3, a vertical fin 4, a ventral fin 5, a horizontal tail 6 and a pusher type propeller 7. The forward fuselage 1 and rear fuselage are covered in an external skin. The external skin may be made of a rigid metal such as, but not limited to, an aluminum alloy such as aluminum 2024 or aluminum 7078 or any other rigid material meeting a maximum waviness tolerance of 0.001 inches per inch measured over a two-inch span.

Figure 1B:
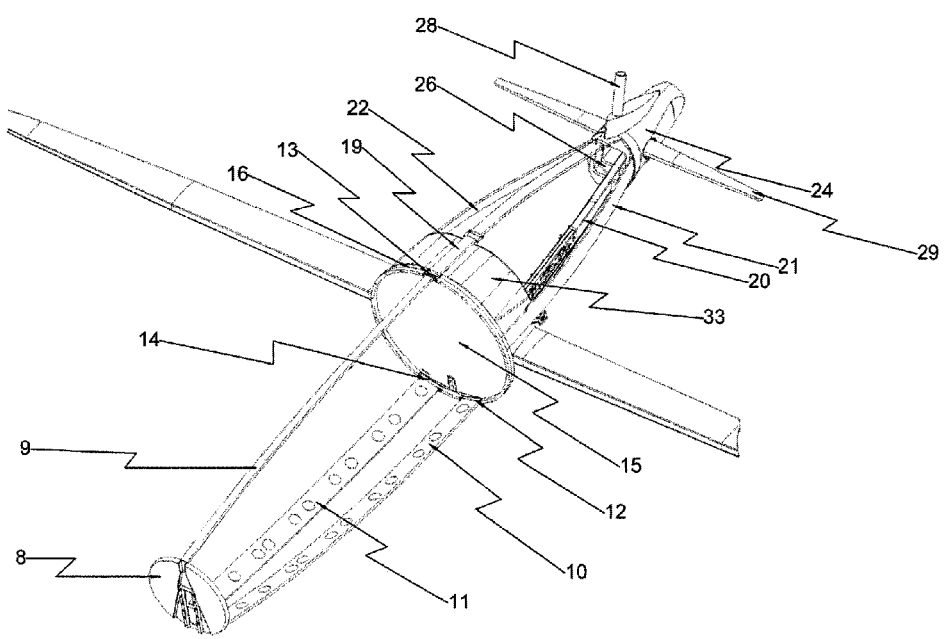
FIG. 1B depicts a breakaway view of the aircraft of FIG. 1.

FIG. 1B depicts a breakaway view of the aircraft of FIG. 1. The frame of the aircraft includes a forward bulkhead 8 connected to an upper truss 9 on one end and two lower forward trusses 10 and 11 on an opposite side of the forward bulkhead 8. The truss elements 9, 10 and 11 may be box type truss structures where the ends of the truss elements 9, 10 and 11 taper towards the forward bulkhead 8, providing improved stiffness at the intersection of the truss elements 9, 10 and 11 and the forward bulkhead 8. The truss elements 9, 10 and 11 are made of a rigid material including metal, fiberglass including S glass, or an equivalent material. Each composite truss element 9, 10 and 11 also includes a unidirectional upper cap, a unidirectional lower cap and shear/compression panels connecting the upper and lower caps. The shear panels may be comprised of +45/−45/0/90 plies of fiberglass, such as S glass or equivalent, configured for crush stiffness when loaded in vertical compression and for the minimal shear loading required by the triangulated configuration of the upper and lower caps.

Each truss elements 9, 10 and 11 extends from the forward bulkhead 8 to the main bulkhead 15 where the truss elements 9, 10 and 11 are affixed to the main bulkhead 15 by fastener devices 12, 13 and 14. The fastener devices 12, 13 and 14 may be comprised of transverse beams which may be formed of metal or a composite such as carbon fiber. Each fastener device 12, 13 and 14 is affixed to a respective truss element 9, 10 and 11 by a securing device such as a bolt passing through the fastening device 12, 13 or 14, the corresponding truss element 9, 10 and 11 and a portion of the main bulkhead 15. Each fastening device 12, 13 and 14 is attached to its respective truss element 9, 10 or 11 by wrapping the inner and outer plies of the truss elements 9, 10 or 11 around the fastening devices 12, 13 and 14, and doubling those plies back upon their outer and inner mating plies, respectively, thus mechanically locking the fastening device 12, 13 or 14 to respective truss element 9, 10 or 11. Similar mechanical locking is used on the truss elements 19 and 20 of the rear fuselage. A main bulkhead transverse beam 16 is affixed to the exposed portions of the periphery of the main bulkhead 15 and is connected to the truss elements 9, 10 and 11.

Truss element 19 is affixed to the top portion of the main bulkhead 15 such that the central axis of the truss element 19 is substantially co-linear with the central axis of the truss element 9. Truss element 20 is affixed to the bottom of the main bulkhead 15, and truss elements 21 and 22 are affixed to opposing sides of the main bulkhead 15. Each of the truss elements 19, 20, 21 and 22 may be box type beams. Truss elements 21 and 22 are configured to resist lateral loads induced by the vertical fin 5 and to provide support for skin cutouts required for the main landing gear doors and upper access hatches as described in further detail herein.

Figure 1C:
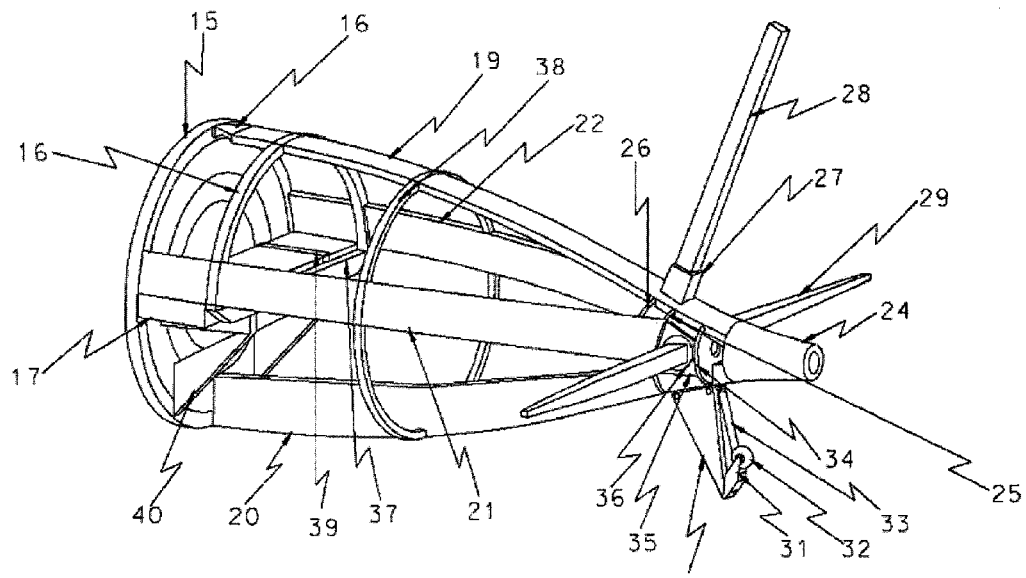
FIG. 1C depicts a rear perspective view of the rear fuselage of FIG. 1A.

Truss elements 19 and 20 extend from the main bulkhead 15 to a rear tail cone 24. Each truss element 19 and 20 is affixed to the rear tail cone 24 using any known method of connection such as bolts, rivets or bonding. The upper surfaces, the surfaces facing away from the center portion of the aircraft, are coplanar with the surface of the tail cone 24. The truss elements 21 and 22 are each affixed to a rear traverse bulkhead 25, shown in FIG. 1C, and to a forward traverse bulkhead 26. A box section support 27, shown in FIG. 1C, is positioned between the rear traverse bulkhead 25 and forward traverse bulkhead 26 on the tail cone 24 to provide support for a vertical fin spar 28. A horizontal tail spar 29 is positioned between the rear bulkhead 25 and an elevator bulkhead 34, shown in FIG. 1C.

A fuel tank 33 is positioned adjacent the main bulkhead 15 in the rear fuselage 2. The fuel tank 33 may be semicircular in shape and be positioned above the mid wing 3. The fuel tank 33 is a separate replaceable bladder manufactured of a metal lined, highly damage tolerant composite structure that is internal to the fuselage and mounted on top of the wing spar, and is outside of the pressure vessel. Conventional wing tanks are difficult to seal and drain, and they are highly vulnerable to rupture in a crash due to their exposed distributed location along the wing span. With wing tanks, volumetric rearrangement in the event of crash-induced high G force loading is difficult to accomplish due to the walls of the tankage being part of the primary structure of the wing. By separably mounting the tank above the heaviest primary structure in the center of the aircraft, and by using a moderately volume-inefficient shape, volume rearrangement and thus survivability of the tank is enhanced.

FIG. 1C depicts a rear perspective view of the rear fuselage 2 of FIG. 1A. The mid wing 3 is coupled to the main bulk head 15 by the sleeve 17. The sleeve 17 is affixed to the main bulkhead 15 by a plurality of straps 39. The straps 39 may be made of unidirectional fiberglass such as S glass, or any other material capable of securing the sleeve 17 to the bulkhead 15. Each strap 39 extends around the periphery of the sleeve 17 such that a first portion of the strap 39 is in direct contact with the top surface of the sleeve 17, a second portion of the strap 39 is in direct contact with a side surface of the sleeve 17, and a third portion of the strap 39 is in direct contact with a lower portion of the sleeve 17. A first end and second end of each strap 39 is affixed to the main bulkhead 15 by any known method of attaching a strap to a bulkhead, including rivets, bolts or bonding.

A gusset 40 is attached to the lower portion of the sleeve 17 on one end and the main bulkhead 15 on the opposite end. The gusset 40 may be triangular in shape, with the wider portion of the gusset 40 connecting to the main bulkhead 15 and the narrower portion of the gusset 40 connecting to the bottom surface of the sleeve 17. The gusset 40 acts to transfer upward loading force of the fuselage to the main bulkhead 15. After installation, the fuel tank 33 shown in FIG. 1B may be positioned on the top surface of the sleeve or on a separate horizontal panel of transverse beam 37, bonded to the structure.

A transverse beam 37 is positioned on the bottom side of each truss element 21 and 22 and the side surface of the sleeve 17. Half support ring 18 extends from the top surface of the transverse beam 37 adjacent to the truss element 21 to the top surface of the transverse beam 37 adjacent the lateral element 22. The top surface of the half support ring 18 is substantially coplanar to the top surface of the truss elements 19, 20 and 21. Full support ring 38 extends from one side of the truss element 20 to the opposite side of the truss element 20 such that the full support element connects to the truss elements 19, 21 and 22. The top surface of the full support ring 38 is substantially coplanar with the top surfaces of the truss elements 19, 20 and 22. Each support ring 18 and 38 is attached to truss elements 19, 20, 21 and 22 by multi-ply tabs as previously discussed or by any other method of attaching a support ring to a truss. Additional full and half support rings may be provided and affixed to the structure in a manner similar to the attachment of the half support ring 18 and full support ring 38.

The horizontal tail spar 29 is affixed between the rear bulkhead 25 and the elevator bulkhead 34. The horizontal tail spar 29 is a continuous single piece spar that is pivotally attached to the rear fuselage by a pair of bearing units 36 mounted in a bearing carrier 35. The outer sides of the bearing carrier 35 are affixed to the rear bulkhead 25 and the elevator bulkhead 34. A tail wheel gusset 30 may be connected to the bottom surfaces of the rear bulkhead 25 and elevator bulkhead 34 to provide ventral fin and propeller protection from a tail strike due to over rotation during takeoff or landing. A wheel extension arm 31 and wheel 32 are rotatively affixed to one end of the gusset 30. An actuator unit 33 is affixed to the bottom surface of the nose cone 24 between the gusset 30 and the end of the cone 24 such that the wheel extension arm 31 and wheel 32 can be extended during and retracted during flight.

Figure 2:
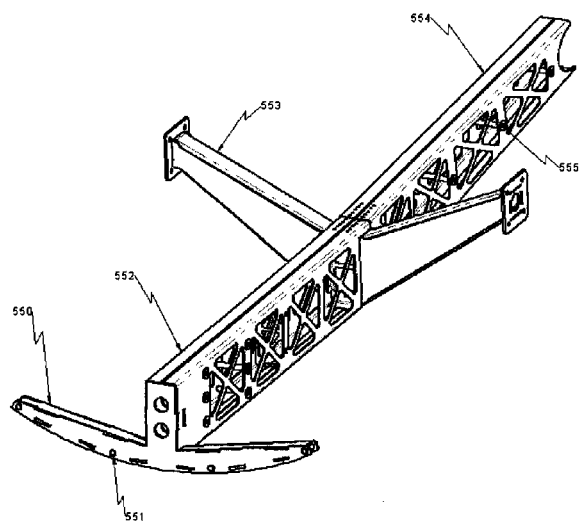
FIG. 2 shows a top perspective view of the truss element.

FIG. 2 shows a top perspective view of the truss element 20. Truss element 20 includes a forward portion 552, a rear portion 554, support units 404 and a bulkhead connection plate 550. The forward portion 552 and rear portion 554 are joined at center joint 560 and the support units 553 are affixed to the sides of the truss element 20 at the center joint 560. The forward portion 552 and rear portion 554 are connected such that the top surface of the forward portion 552 and the top surface of the rear portion 554 form angle theta. In one embodiment, theta is approximately 180 degrees. In another embodiment, theta is between approximately 150 and approximately 178 degrees.

The truss element 20 has a box structure with four sides and a hollow center portion. Openings may be cut along the sides of the truss element 20 to reduce the overall weight of the truss element 20 while also providing support for lateral and vertical loads encountered in flight, landing and takeoff conditions. The support units 553 extend from the sides of the truss element 20 at an angle beta relative to the top surface of the truss element 20. Each support unit 553 includes a connection plate 410 on the end of the support unit 404 furthest from the truss element 20. The bulkhead connection plate 550 is affixed to the front surface of the truss 20. The bulkhead connection plate 550 includes a substantially arc shaped portion that is shaped to engage a lower portion of the main bulkhead 15 using connection openings 551. A plurality of sidewall connection openings 555 are positioned along the sidewalls of the truss element 20 for connecting a motor mount to the truss element 20.

Figure 3:
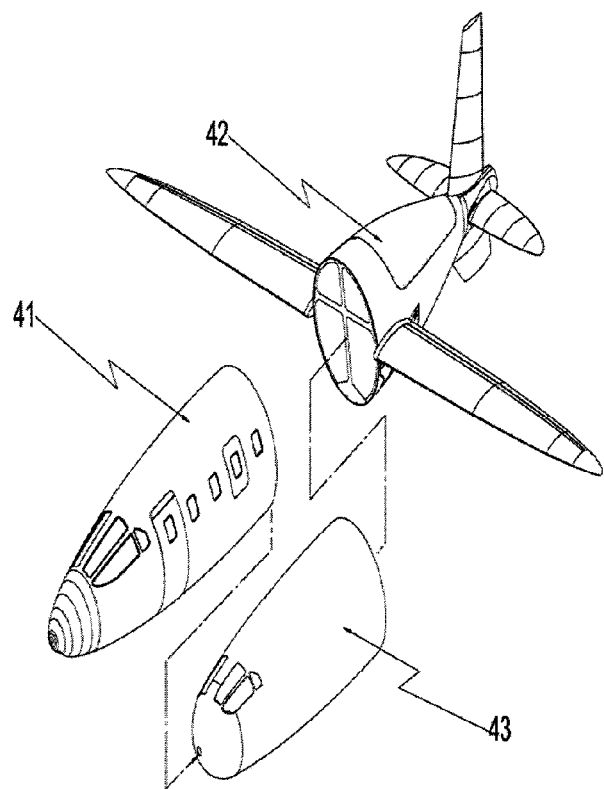
FIG. 3 depicts a breakaway view of the aircraft including the pressure vessel.

FIG. 3 depicts a breakaway view of the aircraft including the pressure vessel. The pressure vessel 43 is positioned in the forward fuselage assembly 42 between the main bulkhead 15 and the nose of the aircraft. Because of the differing forms of the loads induced by local loading by payloads, aerodynamic loads and ground loads and the distributed loading from pressurization, payload-induced loading is applied to the fuselage truss elements 9, 10, 11, 19, 20, 21 and 22, and not the pressure vessel 43, which is isolated from the truss elements 10, 11, 19, 20, 21 and 22. Isolating the pressure vessel 43 eliminates waviness of the external skin due to pressure deflections as would be the case with a conventional monocoque aircraft fuselage structure. Minimal waviness is a necessary criterion for the maintenance of laminar flow over the fuselage, resulting in corresponding low parasite drag of the fuselage.

The pressure vessel 43 is positioned in the forward fuselage assembly 42 such that it is surrounded by the truss elements 9, 10, and 11 and main bulkhead 15. The pressure vessel 43 is structurally isolated from the truss by padding rings on the truss elements 9, 10 and 11 that support the pressure vessel 43. Vertical deflection of the truss elements 9, 10 and 11 will not couple to the pressure vessel 43, and as a consequence structural loading of the elements 9, 10 and 11 by payloads will produce essentially no induced loads in the pressure vessel 43. Similarly, pressurization of the pressure vessel 43 will contribute no loading to the truss elements 9, 10 and 11 in any direction because the two structures are completely decoupled via the pads. The pressure vessel 43 is indexed to the truss elements 9, 10 and 11 by a single standoff (not shown) that penetrates the pressure vessel 43 through a close tolerance hole and is sealed to internal pressure of the pressure vessel 43 by a circular seal that is free to slide in the radial direction on the standoff. The indexing standoff (not show) is one of a number of standoffs that penetrate the pressure vessel 43 through oversized reinforced holes in the pressure vessel 43 and which carry the loads sustained by the floorboards, internal panels and other internal appurtenances through the pressure vessel 43 outwards into the truss elements 9, 10 and 11. All but two of these reinforced holes are loose longitudinal and circumferential fits to the standoffs to allow for pressure vessel expansion, and thus there is only a single longitudinal and circumferential locating position.

The parts of the pressure vessel 43 forward and aft of an index position are free to expand and contract longitudinally, circumferentially and radially without coupling any loads or deflections into the truss elements 9, 10 and 11 and conversely, truss element deflections cannot produce induced loading in the pressure vessel 43. The front dome of the pressure vessel 43 is an ideal hemispherical shape with cutouts for a windshield and windows. Those cutouts are ring and strap reinforced to resist the tangential pressure loads, and the panes are coupled to the vessel 43 in only a radial direction. Therefore, no circumferential loads are transmitted.

The differential thermal expansion and the pressure-induced diaphragm deflections of the panes from the pressure vessel 43 are also reduced by the ring and strap reinforcement. In contrast, the doors are set coplanar to the pressure vessel 43 walls and are fastened in a tangentially load bearing semi-continuous fashion to the walls of the pressure vessel 43 around their entire circumference by means of the sealing device 67. Internal pressure increases latching forces of the doors to the walls of the pressure vessel 43. The doors are thus load-bearing elements of the pressure vessel 43.

Figure 4:
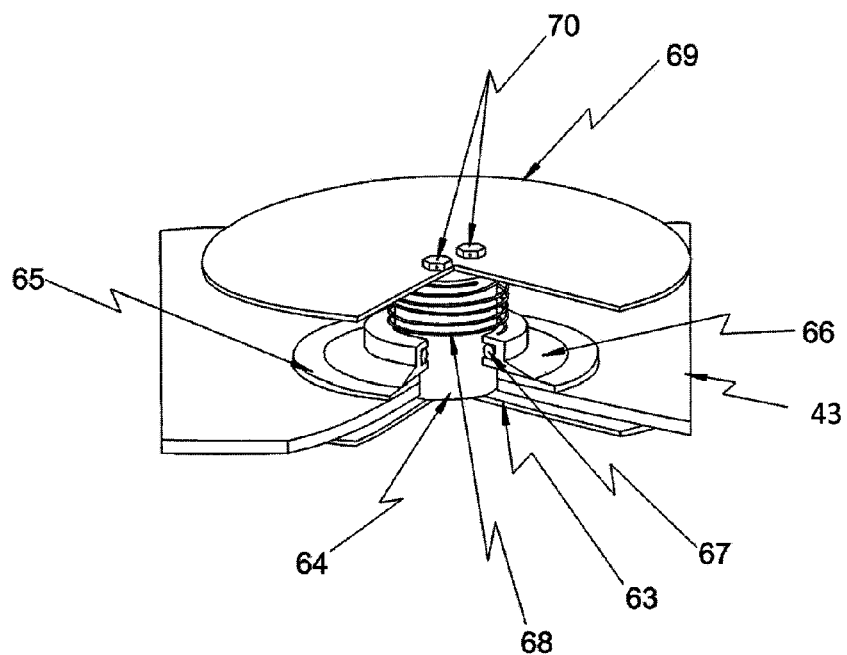
FIG. 4 depicts one embodiment of one of the plurality of standoffs used to secure the pressure vessel.

FIG. 4 depicts one embodiment of one of the plurality of standoffs used to secure the pressure vessel. The standoff includes two load distribution plates 63 and 69. The external plate 69 is affixed to a truss element 9, 10 or 11. The interior plate 63 is affixed to a load bearing structure within the pressure vessel 43. A cylindrical standoff 64 has opposing ends fastened to the distribution plates 63 and 69 by fasteners 70. The fasteners 70 are configured to carry the full load applied to the standoff, and are held in positioned by a locking mechanism such as a tabbed washers, safety wire or any other means of locking the fasteners 70 in place. The cylindrical standoff 64 extends through an opening in the wall of the pressure vessel 62. The opening in the wall of the pressure vessel 43 is sized to accommodate the expansion and contraction of the pressure vessel 43, and the movement of the pressure vessel 43 during operation of the aircraft. Two standoffs 64 that are diametrically opposed, are connected to openings in the pressure vessel 43 that do not compensate for expansion and contraction of the pressure vessel 43 during operation.

The openings in the pressure vessel 43 are reinforced by a plate 65 that has a surface coplanar to the outer surface of the pressure vessel 43. The plate 65 may be made of any material capable of withstanding tangential loads of the pressure vessel 43 including steel, aluminum and alloys thereof, carbon fiber or any other material that can withstand the tangential loads of the pressure vessel 43. The material of the plate 65 also has thermal expansion and elastic characteristics comparable to the material used in the pressure vessel 43. In one embodiment, the pressure vessel 43 and the plate 65 are made from the same material. The interior portion of the plate 65 engages a washer 66. The washer 66 includes a cylindrical boss sized to accommodate a sealing device 67, such as an O-Ring. The sealing device 67 engages the cylindrical standoff 64 such that the washer 66 is in direct contact with the cylindrical standoff 64. A spring 68 positioned between the plate 69 and the washer 66 forces the washer 66 against the plate 65.

The cylindrical standoffs 64 penetrate the pressure vessel 43 through the openings in the pressure vessel 43 wall which reinforced by the washer 66-spring 68 combination to carry the tangential pressure induced loads. The standoffs 64 are fastened to truss elements 9, 10 and 11 as necessary for load distribution. The standoffs 64 are pressure sealed to the wall of the pressure vessel 43 by means of the washers 66 and spring 67, which bosses are sealed by the sealing device 67 that seals the washers 66 to the cylindrical standoffs 64 by the washers' 66 flat but flexible surface resting on the corresponding flat surfaces provided on the inside of the wall of the pressure vessel 43. The combination washer 66 and spring 67 are free to slide both on the standoff 64 outer diameter and on the flat on the inside of the pressure vessel 43 wall. The internal diameter of each opening is large enough with respect to the outer diameter of the penetrating standoffs 64 to allow for all anticipated expansion and contraction of the pressure vessel 43 and deflections of the truss under load. Using these techniques, the pressure vessel 43 sees only well distributed loading due to internal pressure and is completely isolated from payload-induced loads and other flight and ground loads. The weight of the pressure vessel 43 itself is supported by elastomeric foam attached to the interior surfaces of the beams of the forward truss elements 9, 10 and 11. This provides only a padded resting surface for the exterior of the wall of the pressure vessel 43. The pressure vessel 43 can be installed and removed from the forward fuselage 41 as a unit. This is done by separating the forward 41 and rear 42 halves of the fuselage and inserting or removing the pressure vessel through the rear opening of the forward fuselage.

The internal dimensions of the forward fuselage truss elements 9, 10 and 11 are slightly larger than the maximum pressurized diameter of the pressure vessel 43. The truss elements 9, 10 and 11 are bonded to the exterior skin of the aircraft, and the skin forms a shear web between the top truss element 9 and the bottom truss elements 10 and 11. The truss elements 9, 10, and 11 are bonded to the forward bulkhead 8 in a triangulated fashion, and the forward bulkhead carries the nose gear loads into the truss elements 9, 10 and 11. By using multiple standoff penetrators to carry the loads from inside the pressure vessel 43, to the truss elements 9, 10 and 11, a relatively uniformly distributed load on the truss elements 9, 10 and 11 is achieved. This minimizes local deflections and high stress points that could induce undesirable waviness into the outer skin of the fuselage. Both the floorboard structure and the box beams that form the bottom elements of the truss are used as crush structure to manage energy absorption to enhance crashworthiness. The overall aircraft structure is designed for 26 g ultimate loading.

The external skin of the forward fuselage is composed of a formed sandwich panel which is bonded to the truss elements 9, 10, and 11, the forward bulkhead 8 and an attachment ring at the rear of the forward fuselage. The rear fuselage skin is similar and is bonded to the upper, lower, and side truss elements 19 and 20. The rear half of the fuselage contains the main bulkhead 15, which is bonded to the forward ends of the truss elements 19, 20, 21 and 22 and the rear skin. The sleeve 17 is bonded to the main bulkhead 15 and to two truss elements 21 and 22 which are likewise bonded to the skin and to the main bulkhead 15. The truss elements 21 and 22 are provided to stiffen the rear fuselage in the lateral direction. This is necessary due to the large skin cutouts for the main landing gear doors and other access hatches.

The truss elements 19 and 20 are single box beams on both top and bottom. All four box beams and the rear fuselage 43 skin are bonded to the tail cone 24 which carries the horizontal and vertical tail surface attachments and bearings. To allow for a sliding seal surface between the two halves of the horizontal tail and the fuselage, the tail cone 24 is surrounded by a removable, mechanically-fastened fairing that is contoured to fit the rotational movement of the inner surfaces of the horizontal tail. This fairing is a replaceable wear surface that provides the sealing surface for the sliding seal between the horizontal tail and the fuselage.

Figure 5:
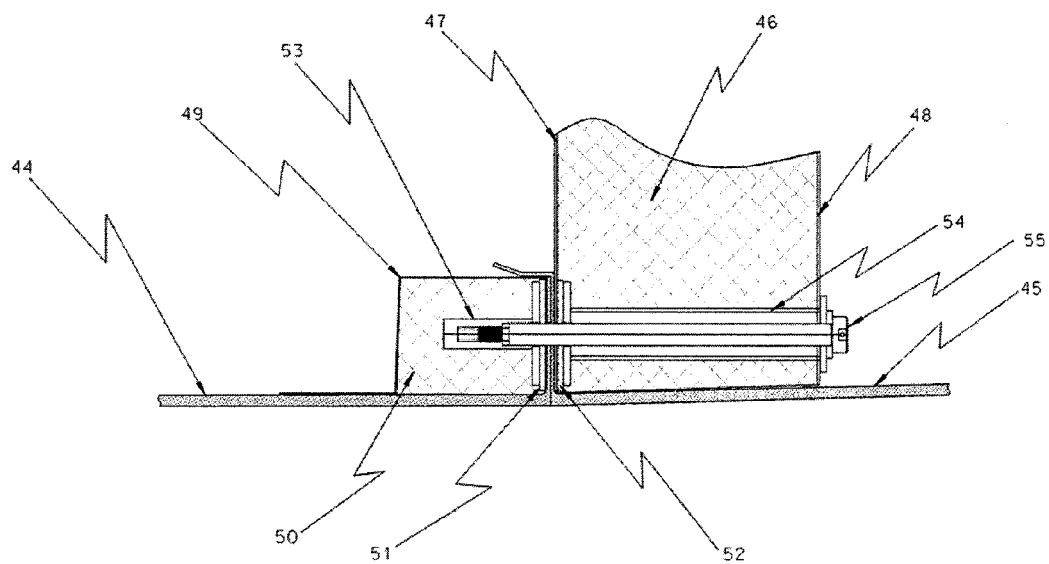
FIG. 5 depicts the attachment of skin to the truss elements.

FIG. 5 depicts the attachment of skin to the truss elements. The forward skin 44 is bonded to a box ring 49 with a core 50. The rear skin 45 is bonded to the main bulkhead 15, the main bulkhead 15 includes a forward skin 47, a rear skin 48, and a core 46. Doubler plies or metal doublers 51 and 52 provide stress distribution of the local loading generated by the fasteners, 55. There are a multiplicity of fasteners distributed circumferentially around the box ring 49 to provide a semi-continuous engagement between the forward skin 44 and the rear skin 45. The fasteners 55 are shoulder bolts that provide shear coupling between the skins, as well as adequate tensile coupling. The fasteners 55 are threaded into a sealed nut plate 53 with a counter bored section to engage the shoulder of the fastener 55. To prevent crushing of the core of the main bulkhead 15, a tubular standoff is bonded to the forward skin of the bulkhead, 47 and the rear skin of the bulkhead 48. This allows the fastener 55 to load the forward bulkhead skin 47 against the rear doubler 52 the rear fuselage skin plies 45 the box ring plies 49 the forward fuselage skin plies 44 and the forward doubler 51 stacked in that order without crushing the main bulkhead core 46 or the box ring core 50.

Figure 6A:
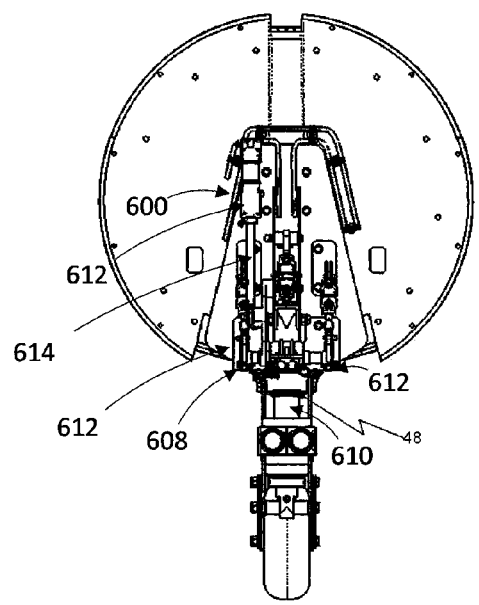
FIG. 6A depicts the front landing gear affixed to the front bulkhead.
Figure 6B:
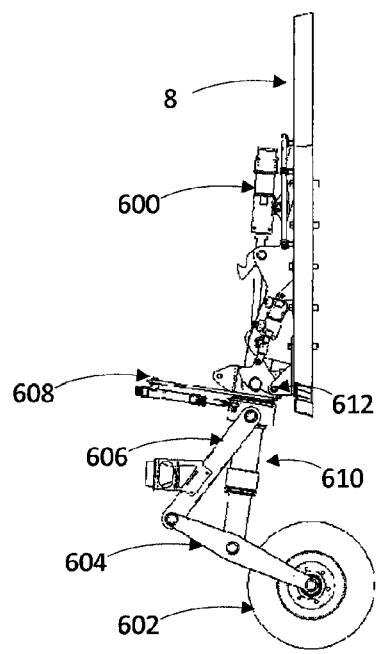
FIGS. 6B-6E depict the front landing gear retracting into the front fuselage.

FIG. 6A depicts the front landing gear 43 affixed to the front bulkhead 8. The landing gear 43 may be an oleo type trailing link landing gear. FIG. 6B-6E depict the front landing gear retracting into the front fuselage. FIG. 6B shows the landing gear 43 in the fully extended position. The front landing gear 43 includes an actuation device 612, a wheel 602, a swing arm 604, a forward link arm 606, a horizontal hinged plate 608 and an oleopneumatic cylinder 610. The swing arm 604 includes two parallel plates with one end of each plate being connected to the wheel 602 by an axle that passes through the center of the wheel 602 and through corresponding openings in the plates of the swing arm 604. The other end of the swing arm 604 opposite the wheel 602 is rotatively coupled to the forward link arm 606 by a pin 610 that allows the swing arm 604 to rotate relative to the forward link arm 606.

The hinged plate 608 is rotatively coupled to the bulkhead 8 by hinges 612 connected to the bulkhead 8 such that the plate 608 is pulled towards the bulkhead 8 as the landing gear 43 is moved to the refracted position and the plate 608 is moved to a position substantially perpendicular to the bulkhead 8 when the landing gear 43 is fully extended. The oleopneumatic cylinder 610 may be a hydraulic piston or air filled piston. The oleopneumatic cylinder 610 has a first end connected to the swing arm 604 between the wheel 602 and the forward link arm 606. In one embodiment, the oleopneumatic cylinder 610 is connected at approximately the center of the swing arm 604. The oleopneumatic cylinder 610 passes through the plate 608 allowing the second end of the oleopneumatic cylinder 610 to rotatively connect to the bulkhead 8 such that the oleopneumatic cylinder 610 rotates towards the bulkhead 8 as the landing gear 43 is retracted. The forward link arm 606 is rotatively connected to the oleopneumatic cylinder 610 at a positioned just below the plate 608. The actuation device 612 is rotatively coupled to the bulkhead 8 by a hinge and to the plate 608 by a hinge. The actuation device 612 includes a base portion 614. The actuation device 602 may be a hydraulic actuator, a linear actuator or any other device capable of retracting and extending the landing gear 43.

Figure 6C:
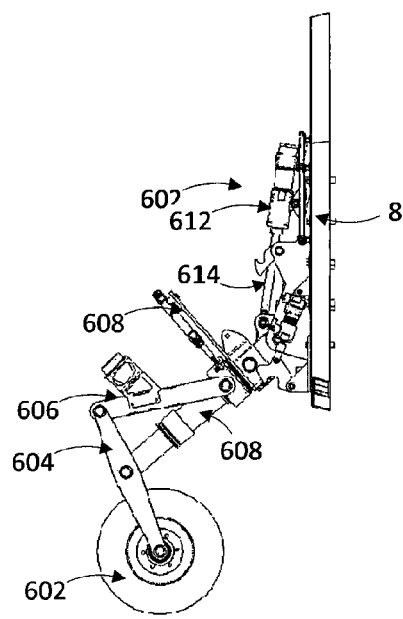
Figure 6D:
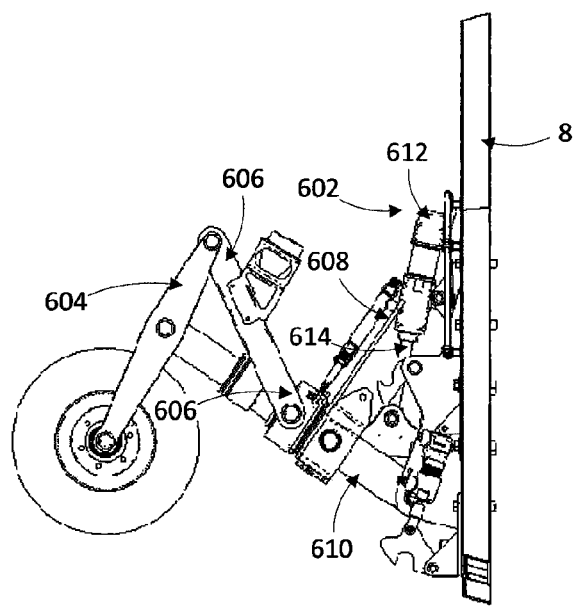
Figure 6E:
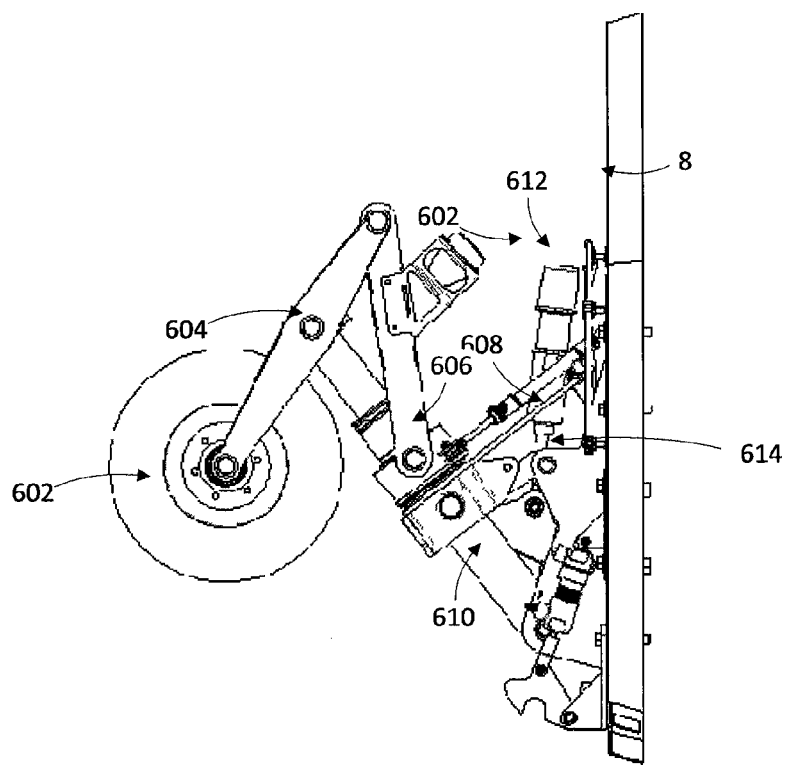

FIG. 6C depicts the landing gear 43 as the landing gear 43 is retracted into the fuselage. The actuation device 612 is activated such that the extension arm 614 retracts into the actuation device 612 pulling the plate 608 towards the bulkhead 8. As the plate rotates towards the bulkhead 8, the forward link arm 606 rotates towards the plate 608 and the swing arm 604 rotates towards the forward link arm 606 pulling the wheel 602 upward. FIG. 6D depicts the landing gear 43 retracting into the fuselage. As the actuation device 612 continues to pull the extension arm 614 into the base 600, the plate 608 is pulled further towards the bulkhead 8 causing the oleopneumatic cylinder 610 to rotate upward and compress, and the extension arms 604 and 606 rotates towards the plate 608 pulling the wheel 602 upwards into the fuselage. FIG. 6E depicts the landing gear 43 fully retracted into the fuselage. The landing gear is extended by extending the extension arm 614 out of the actuation device 612 such that the plate 608 rotates away from the bulkhead 8.

Figure 7A:
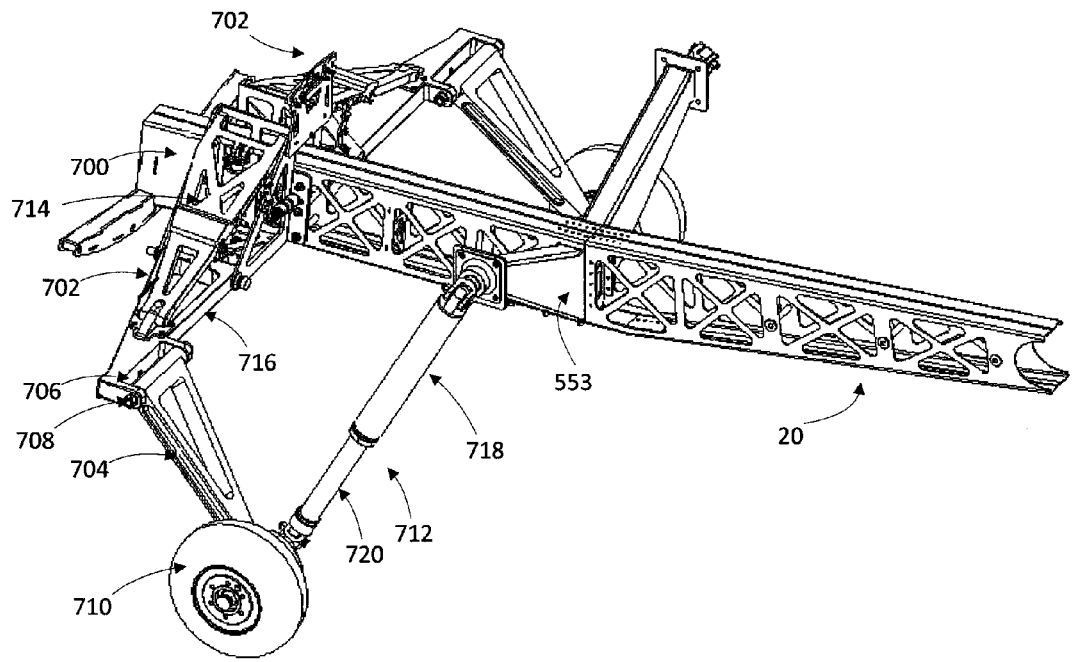
FIG. 7A depicts the main landing gear connected to truss element.

FIG. 7A depicts the rear landing gear 700 connected to truss element 20. The rear landing gear 700 includes two frames 702 that are each substantially A-shaped. Each frame 716 is rotatively affixed to a side of the truss element 20 by a pin. Each frame 716 is also rotatively connected to a trailing link 704 by a pivot joint 706. The pivot joint 706 is substantially 'C' shaped and is sized to accommodate an end of the trailing link 704. A pin 708 passes through both sides of the pivot joint 706 and the trailing link 704 to secure the trailing link 704 in the pivot joint 706. The opposite end of the trailing link 704 is connected to a wheel 710 and one end of a cylinder 712. The other end of each cylinder 712 is rotatively connected to a support unit 553 on the truss element 20 via a universal joint.

Each frame 702 includes an overcenter locking unit 714 that is configured to secure the frame in a fully extended position and a support plate 716 rotatively connected to the truss element 20 by a hinge. The end of the locking unit 714 furthest from the truss element 20 is rotatively coupled to the end of the support plate 716 furthest from the truss element 20. Each locking unit 714 is separated into two sections by a pin. The cylinder 712 may be an hydraulic piston filled with a hydraulic fluid and air. The cylinder 712 includes a cylinder body 718 and rod 720 extending from the cylinder body 718.

Figure 7B:
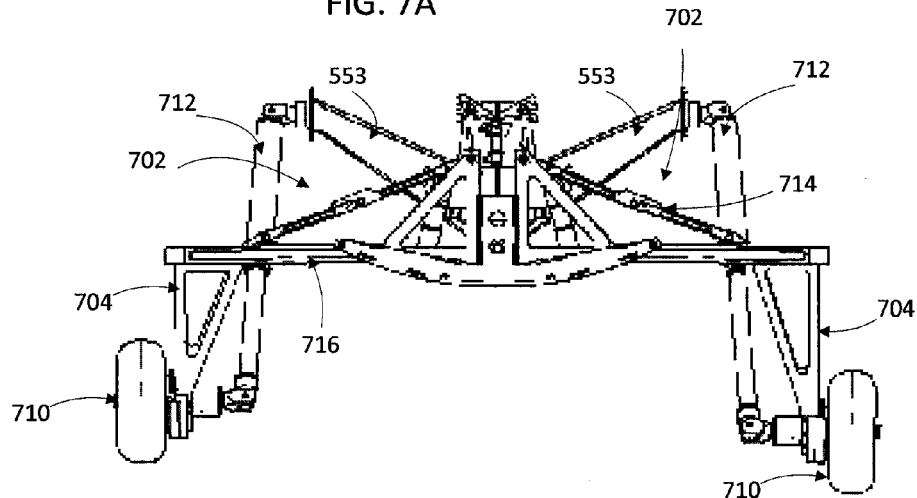
FIGS. 7B-7E depict the main landing gear retracting into the rear fuselage.
Figure 7C:
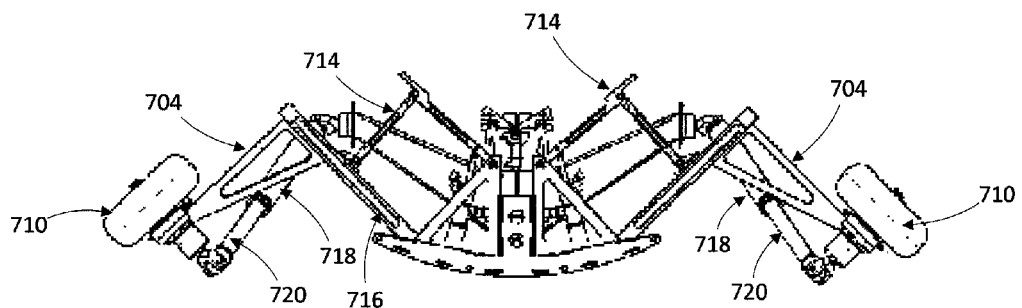
Figure 7D:
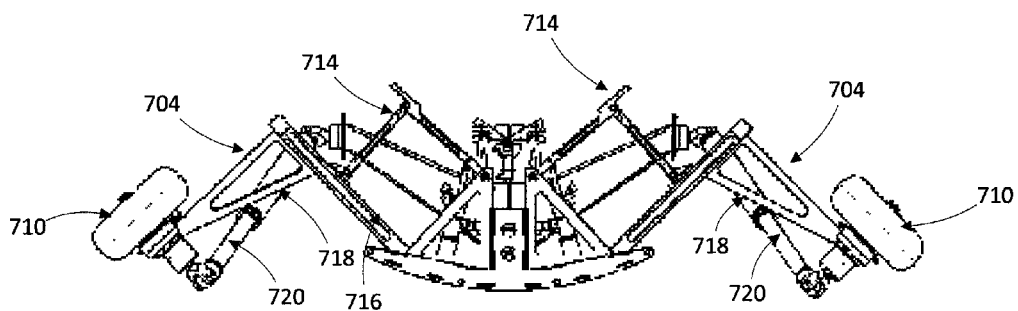

FIG. 7B depicts the rear landing gear 700 in the fully extended position. The locking units 714 are fully extended such that the support plate 716 is substantially perpendicular to the side of the truss element 20. FIG. 7C depicts the rear landing gear 700 retracting into the fuselage. A retraction cylinder folds the locking units 714, pulling the support plate 716 upward. As the support plate 716 moves upward, the two portions of the locking unit 714 rotate about the pin, separating the two portions of the locking unit 714 such that the two portions of the locking unit 714 move towards each other. The movement of the cylinder 712 causes the trailing link 704 to rotate towards the truss element 20, bringing the wheels 710 towards the fuselage. FIG. 7D depicts the rear landing gear 700 further retracting into the fuselage. As the support plate 716 continues to move towards the truss element 20, the cylinder pulls the wheels 710 into the fuselage.

Figure 7E:
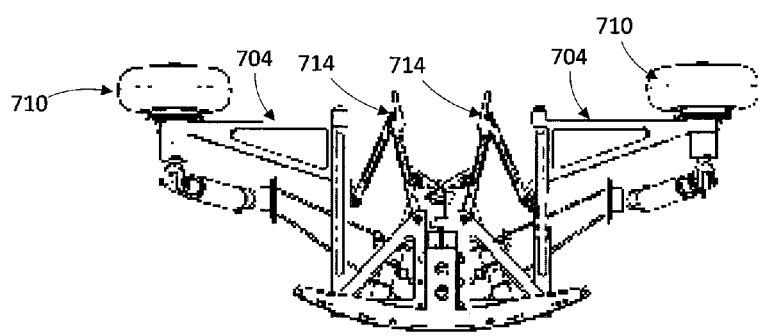

FIG. 7E depicts the rear landing gear 700 fully refracted into the fuselage. The rod 720 is fully extended out of cylinder 712, and the support plate 716 and the central axis of the wheel 710 both are substantially parallel to the side of the truss element 20. The two portions of the locking unit 714 are separated by an angle with the angle being less than 90 degrees.

Propulsion of the aircraft may be provided by a fixed-pitch eight blade composite blade propeller mounted at the rear of the fuselage on the centerline axis. The propeller airfoil sections and section incidence angles are configured to provide maximum efficiency at cruise at 50,000 ft. altitude and above. Propeller diameter is also optimized for the high altitude cruise environment and as a result essentially eliminates supersonic blade velocities during low altitude operation. The optimum propeller diameter is slightly smaller than maximum fuselage diameter which coincidentally reduces the probability of bird strike and other foreign object damage.

The propeller is connected to two engines by a drive shaft extending from the output shaft of a gear box. The engines are liquid-cooled diesel engines driving torque converters connected to the gear box. Multi-stage turbo charging is provided to compensate for altitude and to provide cabin pressurization. Engine heat exchangers, turbo chargers and intercooler heat exchangers are all mounted in ducts configured to provide thermal recovery of waste heat for supplemental propulsion. Engine exhaust is likewise used in the rear of the same duct to provide an injection pump function both for cooling air circulation during low speed operation and to provide additional thrust during flight.

The torque converters are provided to isolate the propeller, drive shaft, and gear box from periodic variations of engine torque and to provide for necessary torque multiplication required by the propeller during low speed operations. Traditional propeller and engine combinations provide no vibration isolation and match engine torque output to propeller demands by varying the pitch of the propeller to reduce the propeller torque demand. This results in much higher propeller speeds during near ground operations, and consequently much greater noise output, and it also results in a propeller airfoil and pitch distribution that is never optimum. The use of torque converters without lockup clutches allows an engine shutdown to disconnect the inoperative engine from the driveshaft and propeller. In the event that both engines are shut down, the propeller is completely disconnected from both engines. Alternators and emergency cabin pressurization remain connected to the drive shaft and are driven by the wind milling propeller. This is the only external mechanical drag load applied to the propeller aside from bearing friction and freewheeling transmission friction.

Figure 8:
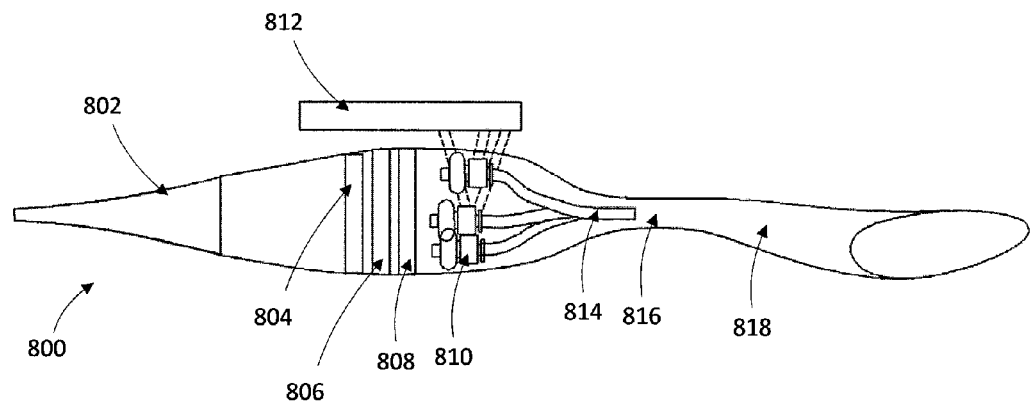
FIG. 8 depicts a heat recovery system used to increase the efficiency of the aircraft.

FIG. 8 depicts a heat recovery system 800 used to increase the efficiency of the aircraft. Cooling air is introduced to the heat recovery system 800 from ducts 802 located on the exterior of the aircraft. The ducts may be NACA submerged ducts. The air introduced via the ducts 802 passes over a first heat exchanger 804. The first heat exchanger 804 provides cool fluid used to cool the air bled from the turbo charger used to pressurize the cabin. The air then passes over a second heat exchanger 806 that provides cooling liquid for the intercoolers that cool the engine air intake. The air then passes through a third heat exchanger 808 that cools the liquid from the engine jacket.

After leaving the third heat exchanger 808, the air passes across the turbo chargers 810. The output of the turbo chargers 810 are connected to the manifold 812 and intercoolers of the engine to provide compressed air to the engine to increase the thrust produced by the engine. The turbine exhaust of all turbo chargers is combined into a single tubular exhaust pipe 814 which combines with a convergent part of the duct 816 to form an injection pump that mixes the turbine exhaust with the heated cooling air flow and then flows through a nozzle to provide additional thrust. In one embodiment, the thermal recovery system 800 generates an additional 5-6 pounds of thrust.

Figure 9:
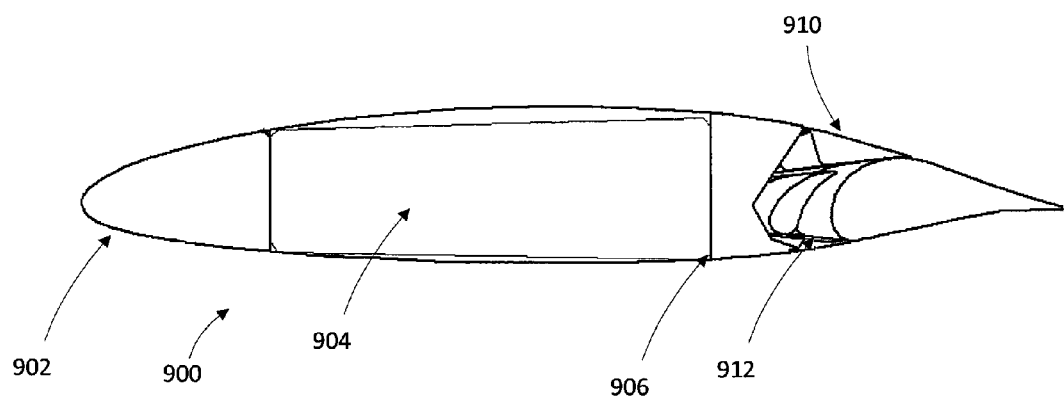
FIG. 9 depicts a side view of the wing spar of the aircraft of FIG. 1.

FIG. 9 depicts a side view of the wing spar 900 of the aircraft of FIG. 1. The wing skin 902 and a sleeve 904 are bonded to the skin 902 at upper and lower surfaces and at corners 906 of the sleeve 904. The sleeve 904 is a tight fit to the wing spar 900 and is pinned to the spar 900 at the wing root by a pin located on the neutral axis of the spar 900. A spoiler 910 and vent 912 are provided for roll control and flight path control. The spoiler 910 and vent 912 are linked to open together to provide a slot lip type aileron. The wing skin 902 is bonded internally to the sleeve 904 such that the skin 904 that slips over the outside of the spar 900 to form a close fit to the spar 900 that is free to slide in the span wise direction to accommodate flexure of the spar 900. In one embodiment, the skin 902 is fastened to the spar 900 at the wing root only. By securing the skin 902 to the spar 900 at the wing root only, the skin 902 is isolated from the spar 900 in order to minimize skin 902 buckling due to bending and to allow for quick replacement of damaged skin sections 902, ease of updating of wing systems and airfoil shapes, and quick installation and removal for inspection of the spar 900 structure and the flap and spoiler systems.

Figure 10A:
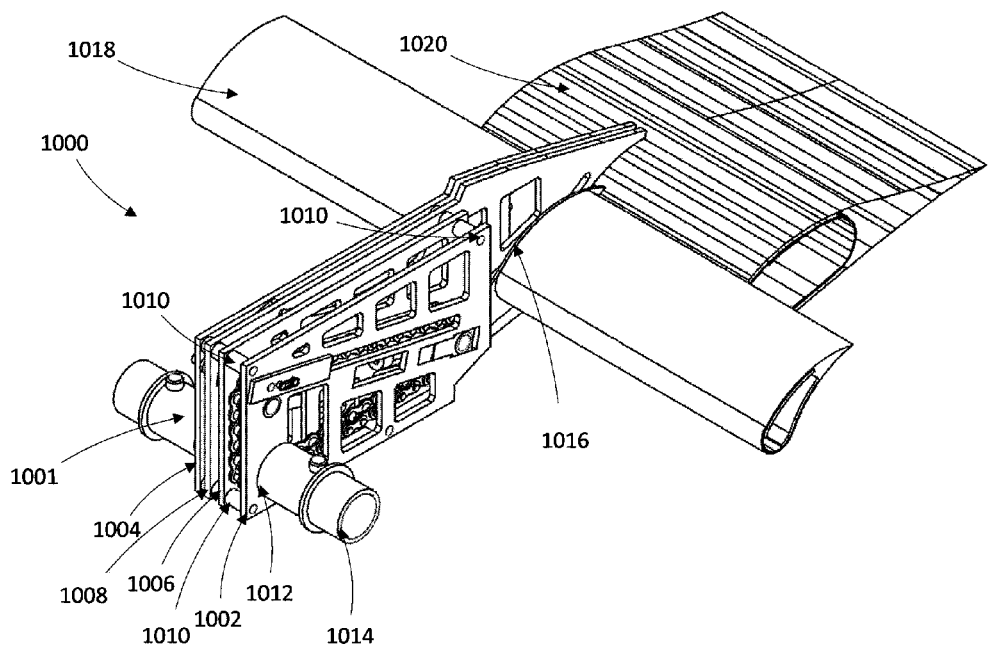
FIG. 10A depicts a flap control system included in the wing of the aircraft in FIG. 1.

FIG. 10A depicts a flap control system 1000 included in the wing of the aircraft in FIG. 1. The flap control system 1000 includes a plurality of control stations 1001 that each includes a plurality of plates 1002, 1004, 1006 and 1008 connected together by fasteners 1010 passing through the corners of each plate. Each plate 1002, 1004, 1006 and 1008 includes an opening 1012 that is sized to accommodate a drive shaft 1014. Each station 1001 is secured to the wing spar 900. The drive shaft 1014 extends the length of the wing and is connected to each control station 1001. The plates 1004 and 1006 have a length longer than the plates 1002 and 1008. One end of the plates 1004 and 1006 includes an opening 1016 that is sized and shaped to accommodate a fore flap 1018. The fore flap 1018 is connected to a flap 1020 by a flap plate (not shown).

Figure 10B:
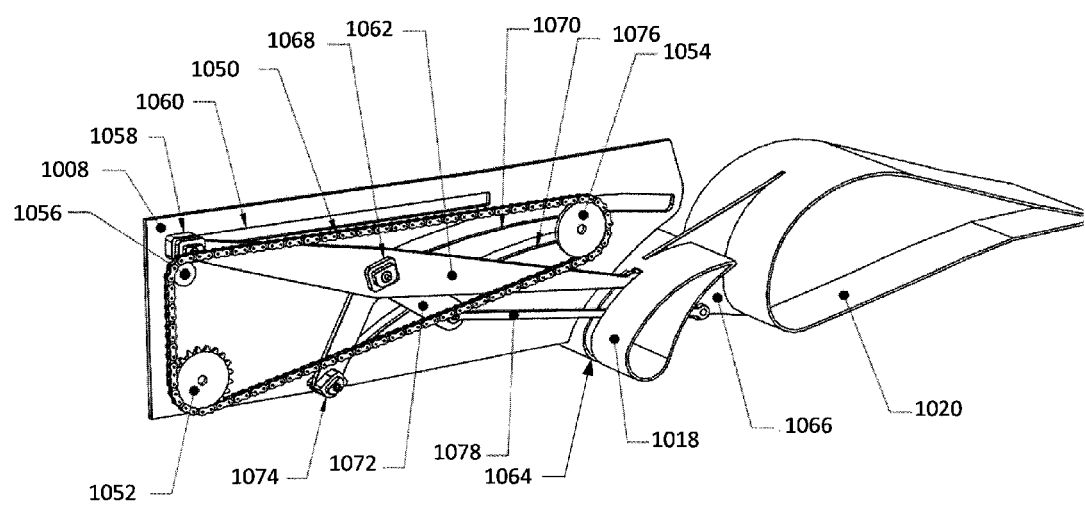
FIG. 10B depicts the flap control system with the plates removed.

FIG. 10B depicts the flap control system 1000 with plates 1002, 1004 and 1008 removed. A chain 1050 is driven by the drive shaft 1014 connected to a sprocket 1052 that wraps around idler gears 1054 and 1056. The drive shaft 1014 rotates both clockwise and counterclockwise to drive the chain 1050 in both forward and reverse directions to extend and retract the flap 1020. The chain 1050 is tensioned by the idler gears 1054 and 1056 and is attached to chain shoe 1058. The chain shoe 1058 is positioned and slides in slot 1060 on the inner surface of plate 1008 and is rotatively connected to one end of a support arm 1062 such that the chain shoe 1058 rotates relative to the support arm 1062. The opposite end of the support arm 1062 connects to the foreflap 1018 through a slot 1064. A second shoe 1068 is connected to the support arm 1062 at approximately the center of the support arm 1062. The second shoe 1068 is positioned and slides in slot 1070 in plate 1008. Slot 1070 is substantially arc shaped and is positioned to allow optimum positioning of the flap 1020 or foreflap 1018 with respect to the wing. A link arm 1072 is substantially 'U' shaped and is connected to the second shoe 1068 at substantially the center of the link arm 1072. One end of the link arm 1072 is coupled to a third shoe 1074 that is positioned and slides in a slot 1076. Slot 1076 is substantially arc shaped and is positioned below the slot 1070. The end of the link arm 1072 opposite the end connected to the third shoe 1074 is connected to tilt arm 1078. The end of the tilt arm 1078 not connected to the link arm 1072 is connected to the lower portion of the flap plate 1066 at a position below the connection of the support arm 1068 to the flap plate 1066.

Figure 11A:
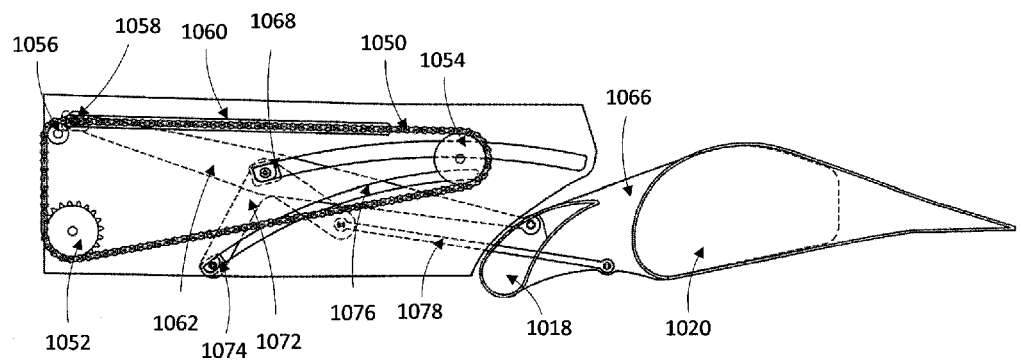
FIG. 11A depicts the flap control system extending to lower the flaps.
Figure 11B:
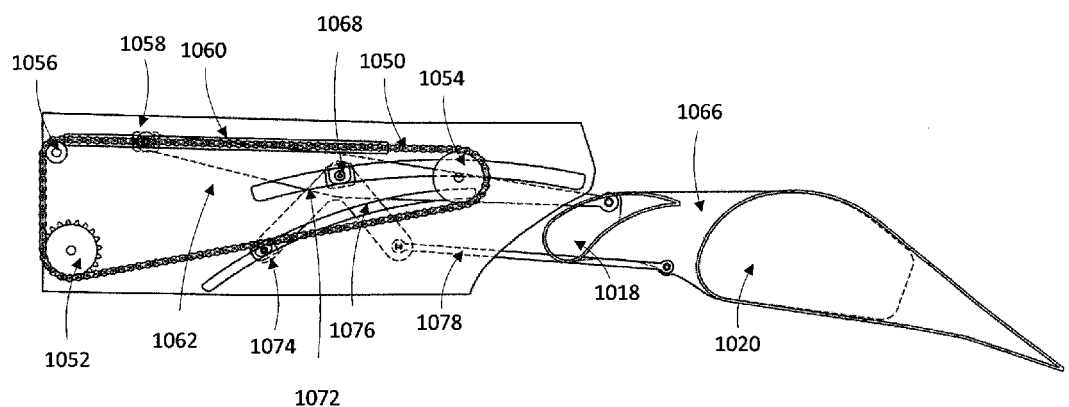
FIG. 11B depicts the flap control system extending the flap downward.

FIG. 11A depicts the flap control system 1000 in the retracted or zero degree position. The chain shoe 1058 is positioned adjacent to the idler gear 1056 in the slot 1060, the third shoe 1074 is positioned near the bottom edge of the plate 1008 in the slot 1076 and the tilt arm 1078 is in its full refracted position. FIG. 11B depicts the flap control system 1000 extending the flap 1020 downward. The sprocket 1052 drives the chain 1060 moving the sprocket 1052 towards the flap 1020. As the sprocket 1058 moves, the support arm 1062 pushes the foreflap 1018 and the flap 1020 outwards. As the support arm 1062 moves, the link arm 1072 moves in the slot 1076 pulling the tilt arm 1078 inwards causing the flap plate 1066 to rotate in a clockwise manner.

Figure 11C:
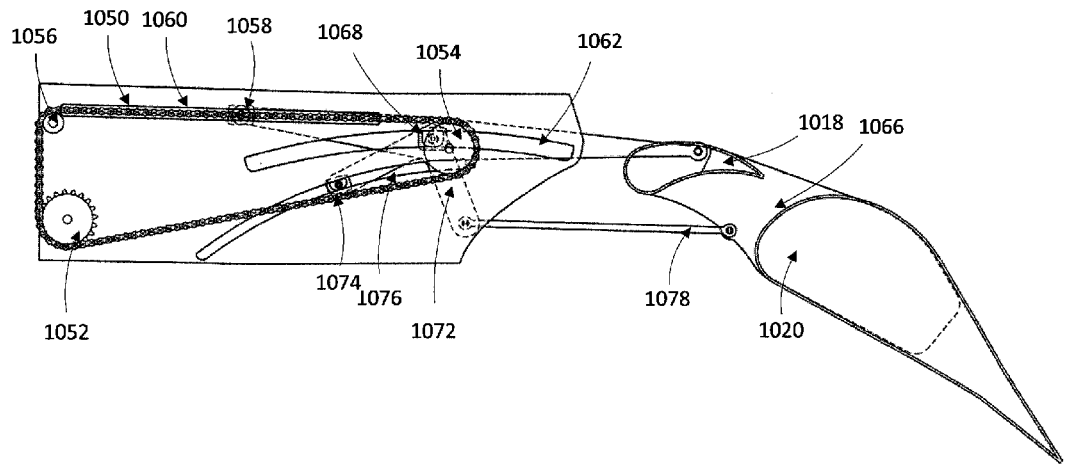
FIG. 11C depicts the flap control system as it extends further outwards.
Figure 11D:
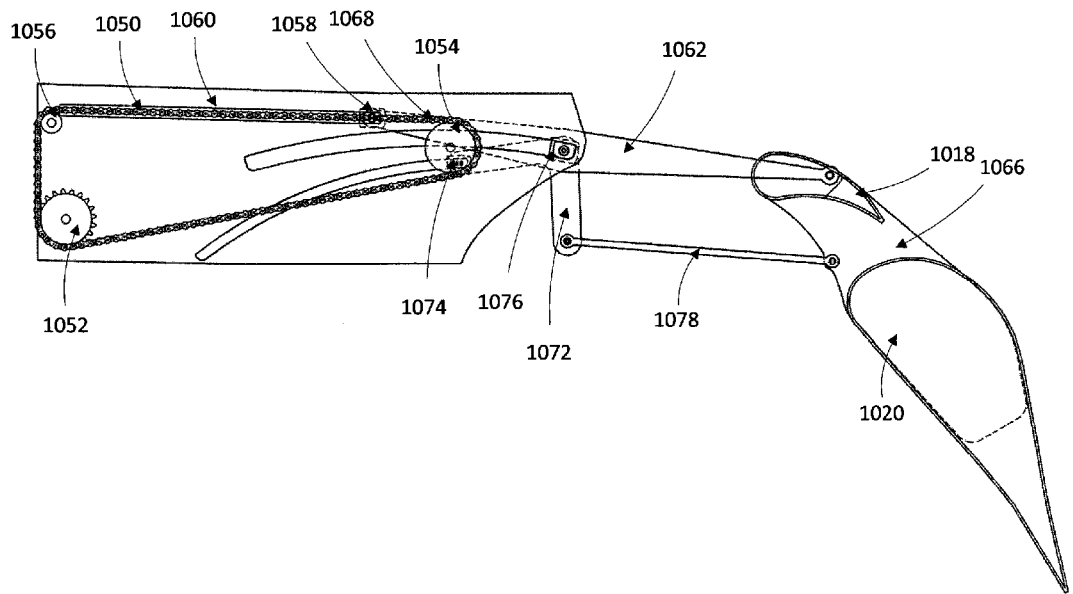
FIG. 11D depicts the flap control system with the foreflap and flap in the full extended position.

FIG. 11C depicts the flap control system 1000 as it extends further outwards. As the chain 1050 continues to move the chain shoe 1058 the support arm 1062 pushes and rotates the foreflap 1018 and the link arm 1072 continues to move in the slot 1076 to push the tilt arm 1078 away from the plate 1008 to rotate the foreflap 1018 and flap 1020 down. FIG. 11D depicts the flap control system with the foreflap 1018 and flap 1020 in the full extended position. The chain shoe 1058 is positioned in the portion of the slot 1060 furthest outward. The link arm 1072 is positioned in the slot 1076 such that a portion of the link arm 1072 is substantially perpendicular to the tilt arm 1078. The flap 1020 is positioned such that the training edge of the flap 1020 points substantially downward.

The flap control system may be a 90% span double-slotted flap system including slot lip spoilers and spoiler vents used for roll control and glide path modulation. All flap tracks are fully internal to the wing when the flaps are refracted, and extension is by means of drive shaft 1014 extending across the full 90% of span with the drive shaft actuator in the center of the wing. Each control station 1001 along the wing converts rotational motion of the drive shaft 1014 to linear motion of the support arm 1062 and the link arm 1072 and the motion of the tilt arm 1078 by means of the sprocket 1056 and chain 1050. The tooth count of the sprocket 1056 is a fixed ratio to chord length of the wing at each span wise station.

Figure 12:
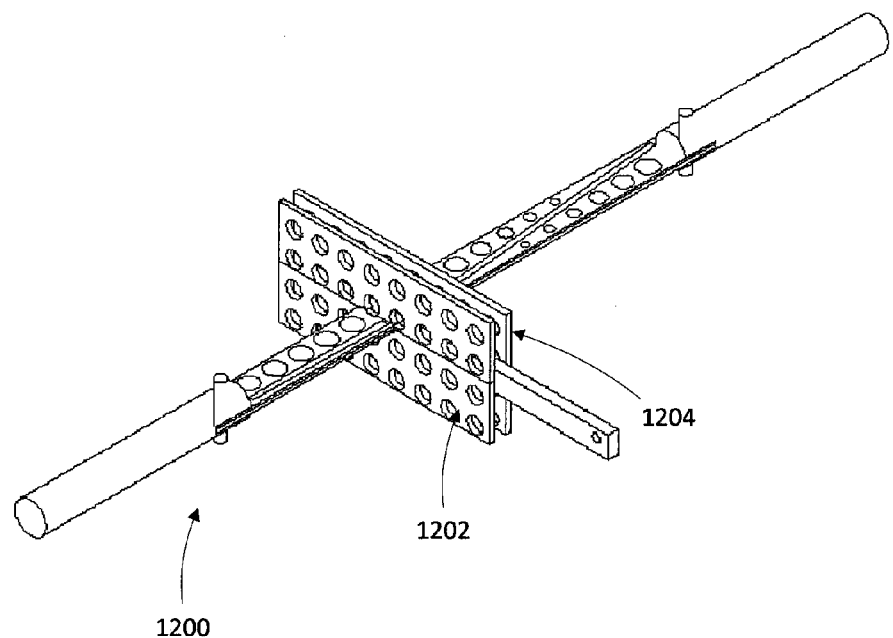
FIG. 12 depicts the spoiler actuation system used to actuate the spoiler of FIG. 9.

FIG. 12 depicts the spoiler actuation system 1200 used to actuate the spoiler 91 of FIG. 9. The spoiler 910 is actuated by means of two slotted mount plates 1202 and 1204 plates and a cam plate 1205 to provide positive control of extension and retraction of the spoiler 91 and full lock of the spoiler 910 in the refracted position. Normally, the cam plates 1205 are linked together and move synchronously, locking one spoiler in the locked down position while proportionately deploying the opposite spoiler with respect to the yoke rotation. Approach path modulation is provided by moving the cam plates 1205 on opposite wings either closer together or farther apart with respect to one another. The entire flap and spoiler mechanism is mounted in the open rear half of the spar of the wing, which provides unrestricted access to the mechanism when the wing glove is removed.

Figure 13A:
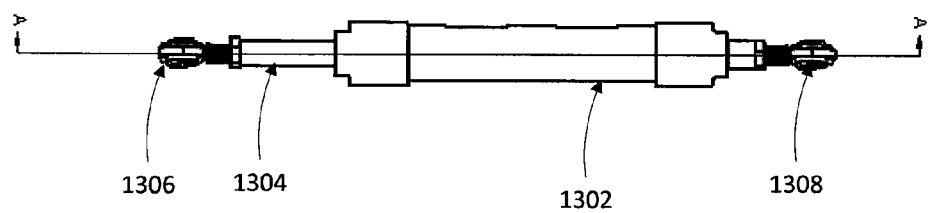
FIG. 13A depicts a trim actuator that is mechanically coupled to the elevator control system and similarly used in the dorsal fin control system.

FIG. 13A depicts a trim actuator 1300 that is mechanically coupled to the elevator control system. A similar actuator is used on the dorsal fin control system. The actuator includes a base housing 1302 and an extension rod 1304 that slides into and out of the base housing 1302. The end of the extension rod 1304 opposite the base housing 1302 and the end of the base housing 1302 opposite the extension rod 1304 each includes a securing unit 1306 and 1308 affixed to the end thereon. The securing units 1306 and 1308 may be eyelets.

Figure 13B:
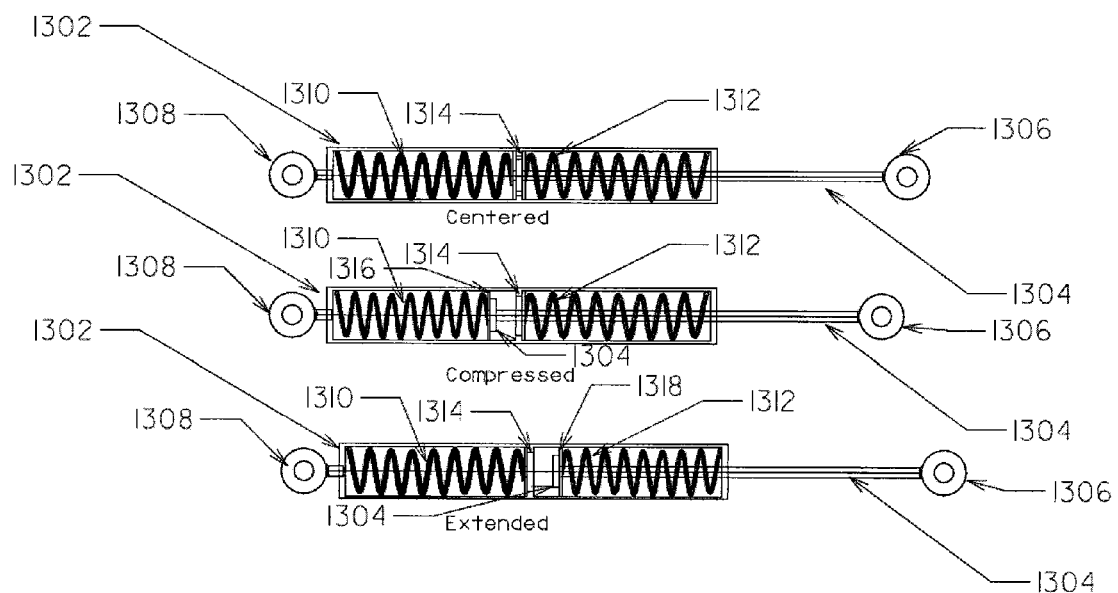
FIG. 13B depicts an interior view of the actuator along the lines A-A.

FIG. 13B depicts an interior view of the actuator 1300 in a centered, compressed and extended position. The base housing 1302 contains two springs 1310 and 1312 and a stop 1314 fastened to the cylinder bore. The extension rod piston 1304 engages two washers 1316 and 1318 that lie on either side of the stop 1314 and against which the springs 1310 and 1312 rest. When the extension piston 1304 is moved in either direction from its neutral position aligned with the stop 1314, it compresses one of the springs 1310 and 1312 which drives the extension rod piston 1304 back into the neutral position. The overall position of the actuator is controlled by a ball bearing jack screw that sets the trim position of the elevator, and a second similar system sets the position of the dorsal fin. The surfaces of the extension rod 1304 and base housing 1302 are never in a stick-free condition, thus eliminating the need for geared tabs and other complications for stabilization.

The aircraft cabin may be approximately 74 inches high and include an approximately 78 inch width having a minimum 50 inch seat pitch. The aircraft has a service ceiling of approximately 65,000 feet, and a normal cruise speed of between approximately 460 to approximately 510 mph, with a specific fuel consumption of approximately 30 to approximately 42 mpg depending on cruise speed and altitude. Landing stall speed is approximately 70 mph, takeoff and landing speeds are approximately 90 mph, and runway requirements are approximately 3000 ft.

It is to be understood that both the foregoing general description and the following detailed description are exemplary and are intended to provide further explanation of the invention claimed. The disclosed configuration is the preferred embodiment and is not intended to preclude functional equivalents to the various elements.

The accompanying drawings, which are incorporated in and constitute part of this specification, are included to illustrate and provide a further understanding of the invention. Together with the description, the drawings serve to explain the principles of the invention.

What is claimed:

1. A wing flap control system on a wing comprising:
    at least two control plates having an opening sized to accommodate a drive shaft;
    the drive shaft engaging each of the openings in each of the plurality of plates;
    a sprocket rotatively affixed to the drive shaft;
    at least two idler sprockets between the control plates;
    a chain engages the sprocket and idler sprockets;
    a support arm rotatively coupled to the chain by a chain shoe at a first end of the support arm and to a foreflap on an opposite end of the support arm;
    a link arm rotatively coupled to a center portion of the support arm and to a flap,
    wherein movement of the drive shaft causes the foreflap and flap to extend and retract to increase or decrease the surface area of the wing.

2. The wing flap control system of claim 1, including a plate on a first side of the control plate.

3. The wing flap control system of claim 1 wherein the link arm is rotatively connected to the support arm by a shoe.

4. The wing flap control system of claim 1, wherein the chain shoe slides in a first slot formed on the surface of the control plate.

5. The wing flap control system of claim 4, wherein the first slot is substantially straight horizontal.

6. The wing flap control system of claim 4, wherein the link arm slides in a second slot formed on the surface of the control plate.

7. The wing flap control system of claim 6, wherein the second slot is substantially arc shaped.

8. The wing flap control system of claim 6, wherein the link arm is substantially u-shaped.

9. The wing flap control system of claim 1, wherein the link arm is connected to the flap and foreflap by a tilt arm.

10. The wing flap control system of claim 9, wherein the foreflap is connected to the flap by a flap plate.

\* \* \* \* \*